(12) United States Patent
Kakishima et al.

(10) Patent No.: US 12,176,983 B2
(45) Date of Patent: Dec. 24, 2024

(54) METHOD OF TRANSMITTING CHANNEL STATE INFORMATION-REFERENCE SIGNAL (CSI-RS), BASE STATION, AND USER EQUIPMENT

(71) Applicants: NTT DOCOMO, INC., Tokyo (JP); DOCOMO INNOVATIONS, INC., Palo Alto, CA (US)

(72) Inventors: Yuichi Kakishima, Tokyo (JP); Chongning Na, Beijing (CN); Min Liu, Beijing (CN); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 6 days.

(21) Appl. No.: 16/651,003

(22) PCT Filed: Sep. 28, 2018

(86) PCT No.: PCT/US2018/053283
§ 371 (c)(1),
(2) Date: Mar. 26, 2020

(87) PCT Pub. No.: WO2019/067825
PCT Pub. Date: Apr. 4, 2019

(65) Prior Publication Data
US 2020/0304193 A1  Sep. 24, 2020

Related U.S. Application Data

(60) Provisional application No. 62/566,191, filed on Sep. 29, 2017.

(51) Int. Cl.
*H04B 7/06* (2006.01)
*H04B 7/08* (2006.01)
(Continued)

(52) U.S. Cl.
CPC ......... *H04B 7/0626* (2013.01); *H04B 7/0695* (2013.01); *H04B 7/088* (2013.01);
(Continued)

(58) Field of Classification Search
CPC .... H04B 7/0626; H04B 7/0695; H04B 7/088; H04W 72/0446; H04W 72/0453; H04W 72/04–0473
See application file for complete search history.

(56) References Cited

U.S. PATENT DOCUMENTS

2013/0156120 A1* 6/2013 Josiam ................. H04B 7/0617
375/260
2013/0272263 A1* 10/2013 Pi ......................... H04L 25/0204
370/330
(Continued)

FOREIGN PATENT DOCUMENTS

WO  2017/136761 A1  8/2017

OTHER PUBLICATIONS

On CSI-RS for CSI acquisition and beam management, Sep. 18-21, 2017, 3GPP TSG RAN WG1 Meeting NR#3, R1-1715448 (Year: 2017).*
(Continued)

*Primary Examiner* — Michael Thier
*Assistant Examiner* — Prince A Mensah
(74) *Attorney, Agent, or Firm* — Osha Bergman Watanabe & Burton LLP

(57) ABSTRACT

A method of transmitting Channel State Information (CSI)-Reference Signals (RSs) in a wireless communication system that includes a base station (BS) and a user equipment (UE) includes transmitting, from the BS to the UE, first multiple CSI-RSs in a CSI-RS resource set that consists of CSI-RS resources. The first multiple CSI-RSs are transmitted using the CSI-RS resources, respectively. The CSI-RS
(Continued)

resource set is repeated in a time domain or a frequency domain. The transmitting transmits second multiple CSI-RSs in the repeated CSI-RS resource set.

5 Claims, 13 Drawing Sheets

(51) Int. Cl.
　　*H04L 5/00*　　　　(2006.01)
　　*H04W 16/28*　　　(2009.01)
　　*H04W 72/0446*　　(2023.01)
　　*H04W 72/0453*　　(2023.01)

(52) U.S. Cl.
　　CPC ............ *H04L 5/005* (2013.01); *H04W 16/28* (2013.01); *H04W 72/0446* (2013.01); *H04W 72/0453* (2013.01)

(56) References Cited

U.S. PATENT DOCUMENTS

| | | | | |
|---|---|---|---|---|
| 2014/0192762 | A1* | 7/2014 | Li | H04L 25/03929 370/329 |
| 2016/0211899 | A1* | 7/2016 | Yang | H04B 7/0617 |
| 2016/0277954 | A1* | 9/2016 | Frenne | H04B 7/0626 |
| 2017/0331535 | A1* | 11/2017 | Wei | H04B 7/0478 |
| 2018/0279152 | A1* | 9/2018 | Kim | H04W 24/10 |
| 2019/0013858 | A1 | 1/2019 | Kakishima et al. | |
| 2019/0089423 | A1* | 3/2019 | Davydov | H04B 7/0478 |
| 2019/0132099 | A1* | 5/2019 | Wu | H04B 7/0621 |
| 2019/0223187 | A1* | 7/2019 | Davydov | H04B 7/0626 |
| 2019/0335442 | A1* | 10/2019 | Wu | H04B 7/088 |
| 2020/0177262 | A1* | 6/2020 | Chen | H04B 7/088 |
| 2020/0244329 | A1* | 7/2020 | Xiao | H04B 7/0413 |

OTHER PUBLICATIONS

Office Action in counterpart Japanese Patent Application No. 2020-517811 issued on May 25, 2021 (8 pages).
Huawei et al.; "Beam reporting for beam management"; 3GPP TSG RAN WG1 Meeting #90, R1-1713757; Prague, Czech Republic; Aug. 21-25, 2017 (11 pages).
3GPP TS 36.211 V14.4.0 "3rd Generation Partnership Project; Technical Specification Group Radio Access Network; Evolved Universal Terrestrial Radio Access (E-UTRA); Physical channels and modulation (Release 14)" Sep. 2017 (197 pages).
3GPP TS 36.213 V14.4.0 "3rd Generation Partnership Project; Technical Specification Group Radio Access Network; Evolved Universal Terrestrial Radio Access (E-UTRA); Physical layer procedures (Release 14)" Sep. 2017 (462 pages).
Extended European Search Report issued in counterpart European Patent Application No. 18792632.4, mailed on Apr. 9, 2021 (7 pages).
3GPP TSG RAN WG1 Meeting NR#3; R1-1715448 "On CSI-RS for CSI acquisition and beam management" ZTE, Sanechips; Nagoya, Japan; Sep. 18-21, 2017 (9 pages).
3GPP TSG RAN WG1 Meeting #90; R1-1712226 "General framework for CSI acqusition and beam management" Huawei, HiSilicon; Prague, Czech Republic; Aug. 21-25, 2017 (10 pages).
3GPP TSG RAN WG1 Meeting NR#3; R1-1716082 "Views on NR Beam Management" NTT DOCOMO; Nagoya, Japan; Sep. 18-21, 2017 (8 pages).
International Search Report issued in International Application No. PCT/US2018/053283, mailed Jan. 21, 2019 (3 pages).
Written Opinion issued in International Application No. PCT/US2018/053283; Dated Jan. 21, 2019 (7 pages).
Office Action issued in European Application No. 18792632.4; Dated Oct. 26, 2021 (8 pages).
Office Action issued in Chinese Application No. 201880055434.8; Dated Dec. 1, 2021 (17 pages).
Decision of Refusal issued in Japanese Application No. 2020-517811 mailed on Jan. 5, 2022 (6 pages).
Office Action issued in Chinese Application No. 201880055434.8; Dated Nov. 3, 2022 (14 pages).
Office Action issued in the counterpart Chinese Patent Application No. 201880055434.8, mailed on Jun. 29, 2023 (8 pages).

* cited by examiner

METHOD OF TRANSMITTING CHANNEL STATE INFORMATION-REFERENCE SIGNAL (CSI-RS), BASE STATION, AND USER EQUIPMENT

TECHNICAL FIELD

One or more embodiments disclosed herein relate to a method of transmitting a Channel State Information (CSI)-Reference Signal (RS) for beam management in a wireless communication system, a base station, and a user equipment.

BACKGROUND

New Radio (NR; fifth generation (5G) radio access technology) supports the following configurations for P1/P2/P3 beam management (BM) schemes.

In the P1 (or joint P2 and P3) BM scheme, multiple CSI-RS resource sets for BM are configured in a resource setting. The resource setting includes a parameter "repetition" set to "ON" or "OFF." For each CSI-RS resource set, repetition must be set to "ON." If repetition is set to "ON," a user equipment (UE) reports, to a base station (BS), at least a CSI-RS resource set indicator for CSI-RS Resource Indicator (CRI) feedback. Whether set ID(s) are local within a resource setting or global across all resource settings has been studied.

In the P2 BM scheme, one resource set is configured in a resource setting with repetition "OFF" and the UE reports, to the BS, at least a local CSI-RS resource indicator within the resource set for CRI feedback.

In the P3 BM scheme, one resource set is configured in a resource setting with repetition "ON" and the UE does not report CRI related information.

As shown in FIG. 1, in the P2 BM scheme, TX beam sweeping with a fixed RX beam may be performed, and then a refined TX beam may be founded.

In a CSI-RS configuration (P2), one resource set is configured in a resource setting with repetition "OFF." A UE assumes that all CSI-RS resources within a resource set are not spatially Quasi-Co-Location (QCL)ed and different TX beams are applied to different CSI-RS resources within the resource set.

As shown in FIG. 2, in the P3 procedure, RX beam sweeping with a fixed TX beam may be performed, and then a refined RX beam may be founded.

In a CSI-RS configuration (P3), one resource set is configured in a resource setting with repetition "ON." A UE assumes that all CSI-RS resources within a resource set are spatially QCLed and the same TX beams are applied to different CSI-RS resources within the resource set.

As shown in FIG. 3, in the P1 beam management procedure, TX beam sweeping and RX beam sweeping may be performed, and then a refined TX/RX beam pairs may be founded. In CSI-RS configuration (P1) requirements, it shall enable TX beam refinement with TX beam sweeping and a fixed RX beam, it shall enable RX beam refinement with RX beam sweeping and a fixed TX beam, and it shall reuse the configuration of repetition indicator "ON/OFF."

FIGS. 4A and 4B are diagrams showing an example of the P1 BM scheme where multiple CSI-RS resource sets are configured in a resource setting. In FIGS. 4A and 4B, the TX and the RX may be a BS and a UE, respectively. A CSI-RS resource index identifies each TX beam in each CSI-RS resource set. A CSI-RS resource set index identifies each CSI-RS resource set. In the P1 BM, as shown in FIG. 4B, the same TX beam for different CSI-RS resources is within a resource set. For example, in an example of FIG. 4B, the same four TX beams "TxBF-1" is with in CSI-RS resource set 1. In a similar manner, the same four TX beams "TxBF-2" is with in CSI-RS resource set 2. The UE applies different RX beams for different CSI-RS resources within a resource set, and then performing RX beam sweeping within a resource set. The different TX beams are used for different CSI-RS resource sets. TX beam sweeping is performed across different resource sets. The UE reports at least a CSI-RS resource set indicator for CSI-RS Resource Indicator (CRI) feedback. In the P1 BM scheme of FIGS. 4A and 4B, the UE may sweep multiple RX beams with in a CSI-RS resource set. As a result, configurations of the UE may become complexity and limit the number of beams used by the UE.

CITATION LIST

Non-Patent Reference

[Non-Patent Reference 1] 3GPP, TS 36.211 V 14.4.0
[Non-Patent Reference 2] 3GPP, TS 36.213 V14.4.0

SUMMARY

One or more embodiments of the present invention relate to a novel CSI-RS configuration that configures a single set of CSI-RS with different TX beams for different CSI-RSs within the set. A semi-persistent transmission of the set may allow the UE to apply different UE RX beams for different sets. The UE reports the selected CSI-RS index according to some predefined criteria, e.g., best quality.

One or more embodiments of the present invention relate to a method of transmitting CSI-RSs in a wireless communication system that includes a BS and a UE. The method includes transmitting, from the BS to the UE, first multiple CSI-RSs in a CSI-RS resource set that consists of CSI-RS resources. The first multiple CSI-RSs are transmitted using the CSI-RS resources, respectively. The CSI-RS resource set is repeated in a time domain or a frequency domain. The transmitting transmits second multiple CSI-RSs in the repeated CSI-RS resource set.

One or more embodiments of the present invention relate to a BS in a wireless communication system that includes a transmitter that transmits, to the UE, first multiple CSI-RSs in a CSI-RS resource set that consists of CSI-RS resources. The first multiple CSI-RSs are transmitted using the CSI-RS resources, respectively. The CSI-RS resource set is repeated in a time domain or a frequency domain. The transmitter transmits second multiple CSI-RSs in the repeated CSI-RS resource set.

One or more embodiments of the present invention relate to a UE in a wireless communication system that includes a receiver that receives, from a BS, first multiple CSI-RSs in a CSI-RS resource set that consists of CSI-RS resources. The first multiple CSI-RSs are transmitted from the BS using the CSI-RS resources, respectively. The CSI-RS resource set is repeated in a time domain or a frequency domain. The receiver receives second multiple CSI-RSs in the repeated CSI-RS resource set.

One or more embodiments of the present invention can reduce the UE complexity, increase the implementation flexibility to support different types of UE with different RX beam sweeping capabilities.

DETAILED DESCRIPTION

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
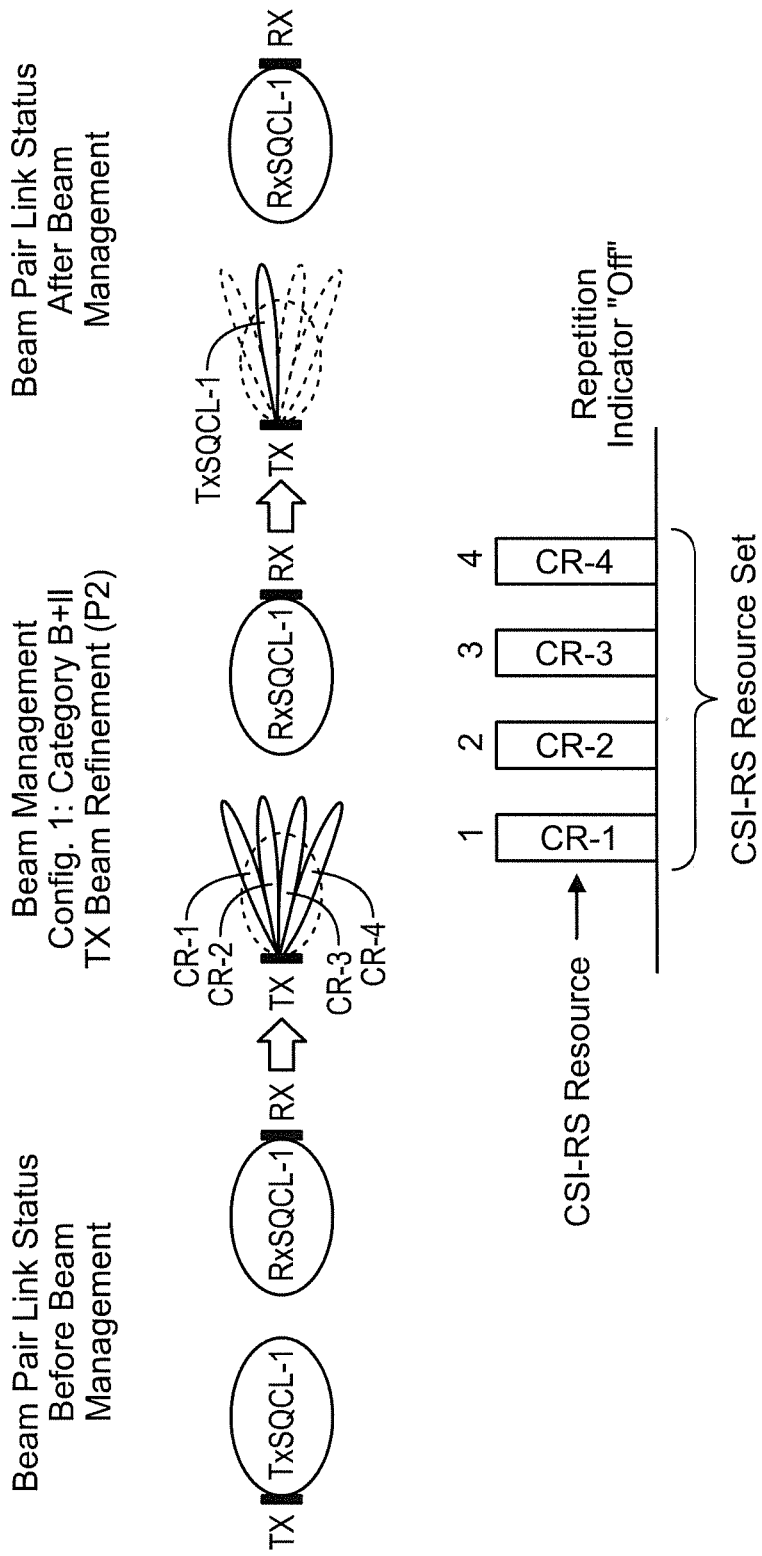
FIG. 1 is a diagram showing an example of a P2 beam management scheme and a CSI-RS Configuration for the P2 beam management.
Figure 2:
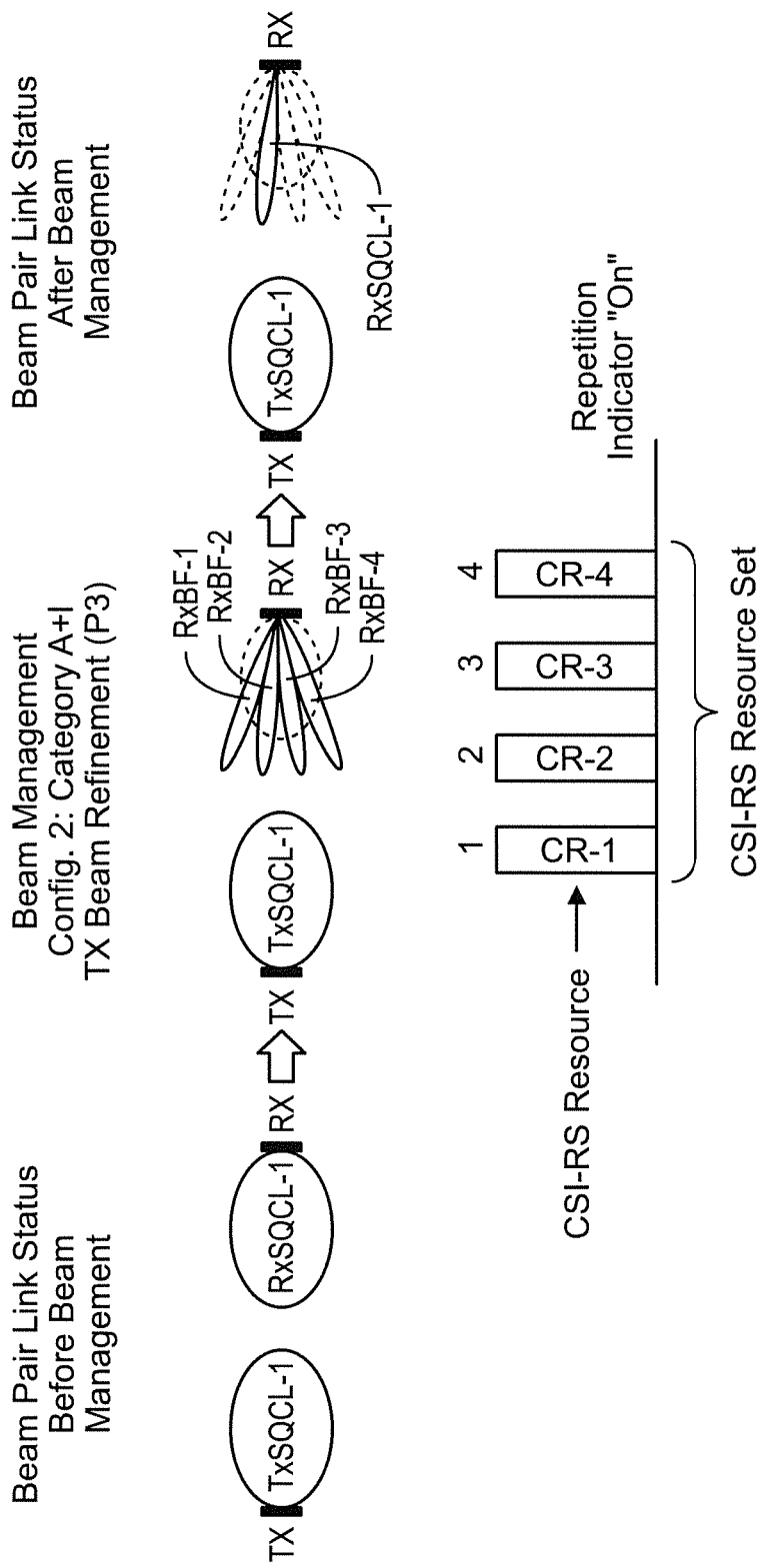
FIG. 2 is a diagram showing an example of a P3 beam management scheme and a CSI-RS Configuration for the P3 beam management.
Figure 3:
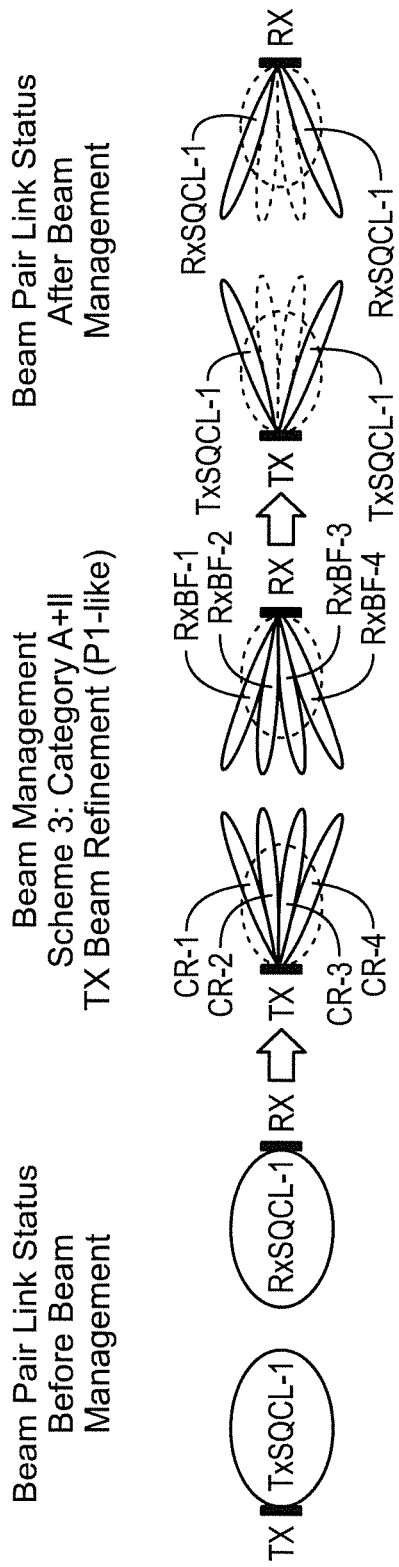
FIG. 3 is a diagram showing an example of a P1 beam management scheme and a CSI-RS Configuration for the P1 beam management.
Figure 4A:
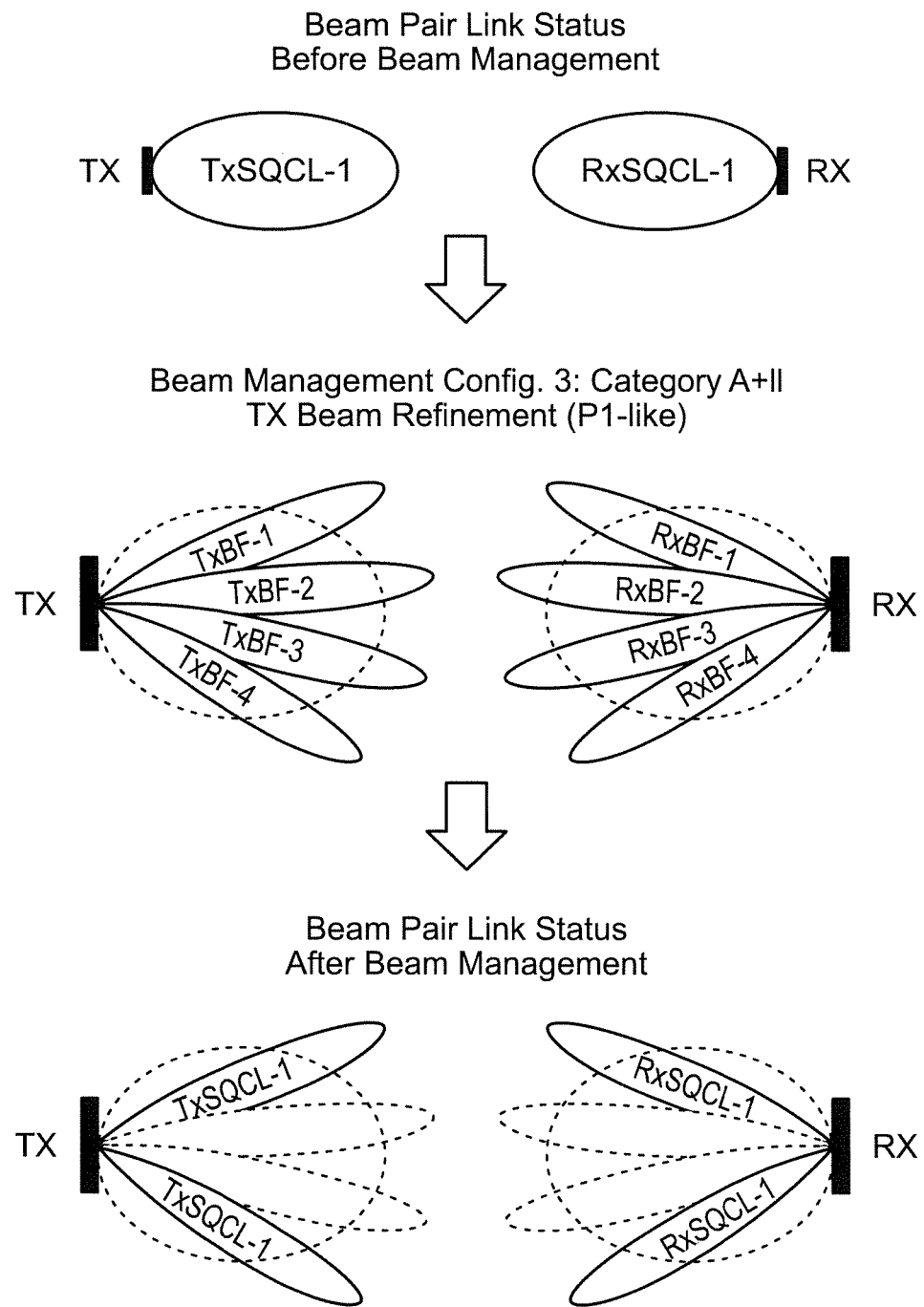
FIGS. 4A and 4B are diagrams showing an example of a P1 beam management scheme and a CSI-RS Configuration for the P1 beam management.
Figure 4B:
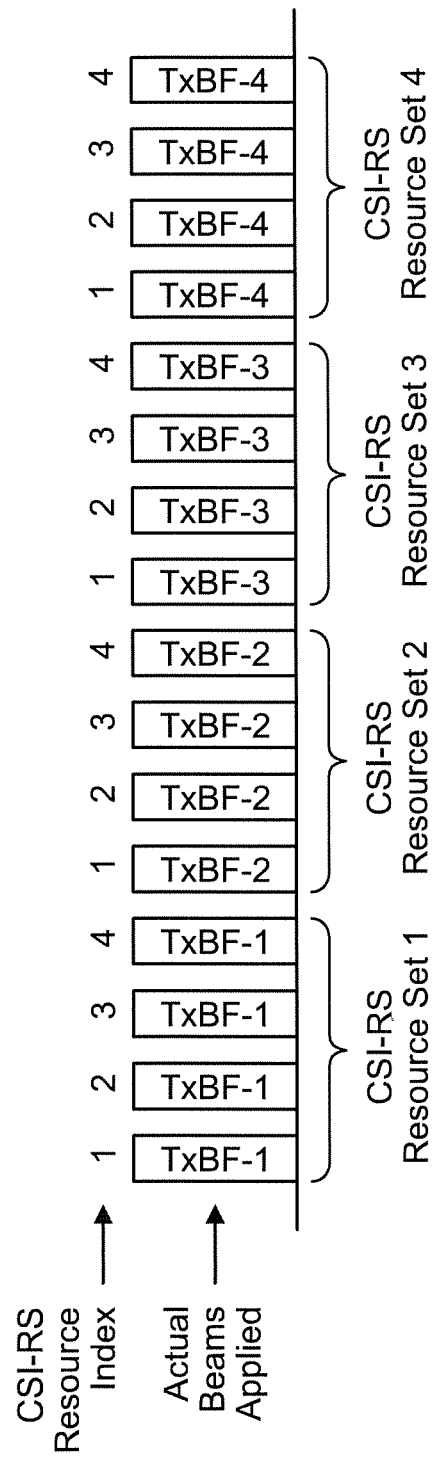
Figure 5:
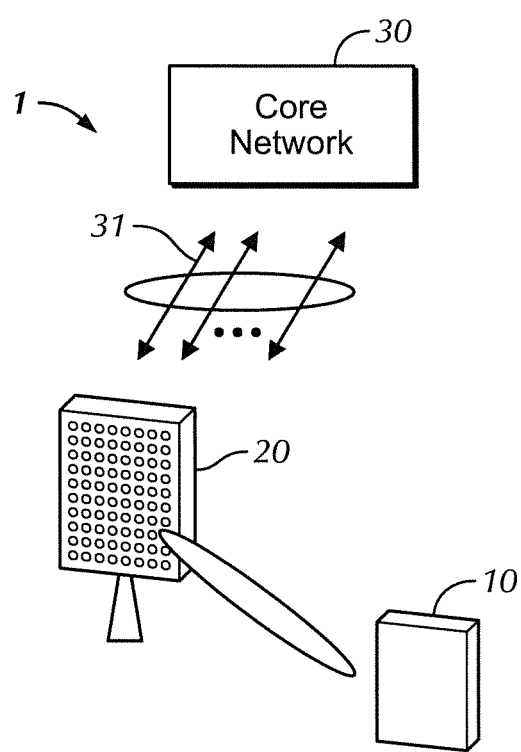
FIG. 5 is a diagram showing a configuration of a wireless communication system according to one or more embodiments of the present invention.

FIG. 5 is a diagram showing a wireless communications system 1 according to one or more embodiments of the present invention. The wireless communication system 1 includes a base station (BS) 20, a user equipment (UE) 10, and a core network 30. In one or more embodiments of the present invention, the BS 20 and the UE 10 may be referred to as a transceiver (TX) and a receiver (RX), respectively. The wireless communication system 1 may be a New Radio (NR) system. The wireless communication system is not limited to the specific configurations described herein and may be any type of wireless communication system such as a Long Term Evolution (LTE) system or an LTE-Advanced (LTE-A) system.

The BS 20 may communicate uplink (UL) and downlink (DL) signals with the UE 10 in a cell of the BS 20. The DL and UL signals may include control information and user data. The BS 20 may communicate DL and UL signals with the core network 30 through backhaul links 31. The BS 20 may be a gNodeB (gNB) in a NR system. The BS 20 may be referred to as a transmission and reception point (TRP). For example, when the wireless communications system is an LTE system, the BS 20 may be an evolved NodeB (eNB).

The BS 20 includes antennas, a communication interface to communicate with an adjacent BS 20 (for example, X2 interface), a communication interface to communicate with the core network (for example, S1 interface), and a CPU (Central Processing Unit) such as a processor or a circuit to process transmitted and received signals with the UE 10. Operations of the BS 20 may be implemented by the processor processing or executing data and programs stored in a memory. However, the BS 20 is not limited to the hardware configuration set forth above and may be realized by other appropriate hardware configurations as understood by those of ordinary skill in the art. Numerous BSs 20 may be disposed so as to cover a broader service area of the wireless communication system.

The UE 10 may communicate DL and UL signals that include control information and user data with the BS 20 using Multi Input Multi Output (MIMO) technology. The UE 10 may be a mobile station, a smartphone, a cellular phone, a tablet, a mobile router, or information processing apparatus having a radio communication function such as a wearable device. The wireless communication system may include one or more UEs 10.

The UE 10 includes a CPU such as a processor, a RAM (Random Access Memory), a flash memory, and a radio communication device to transmit/receive radio signals to/from the BS 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

Figure 6A:
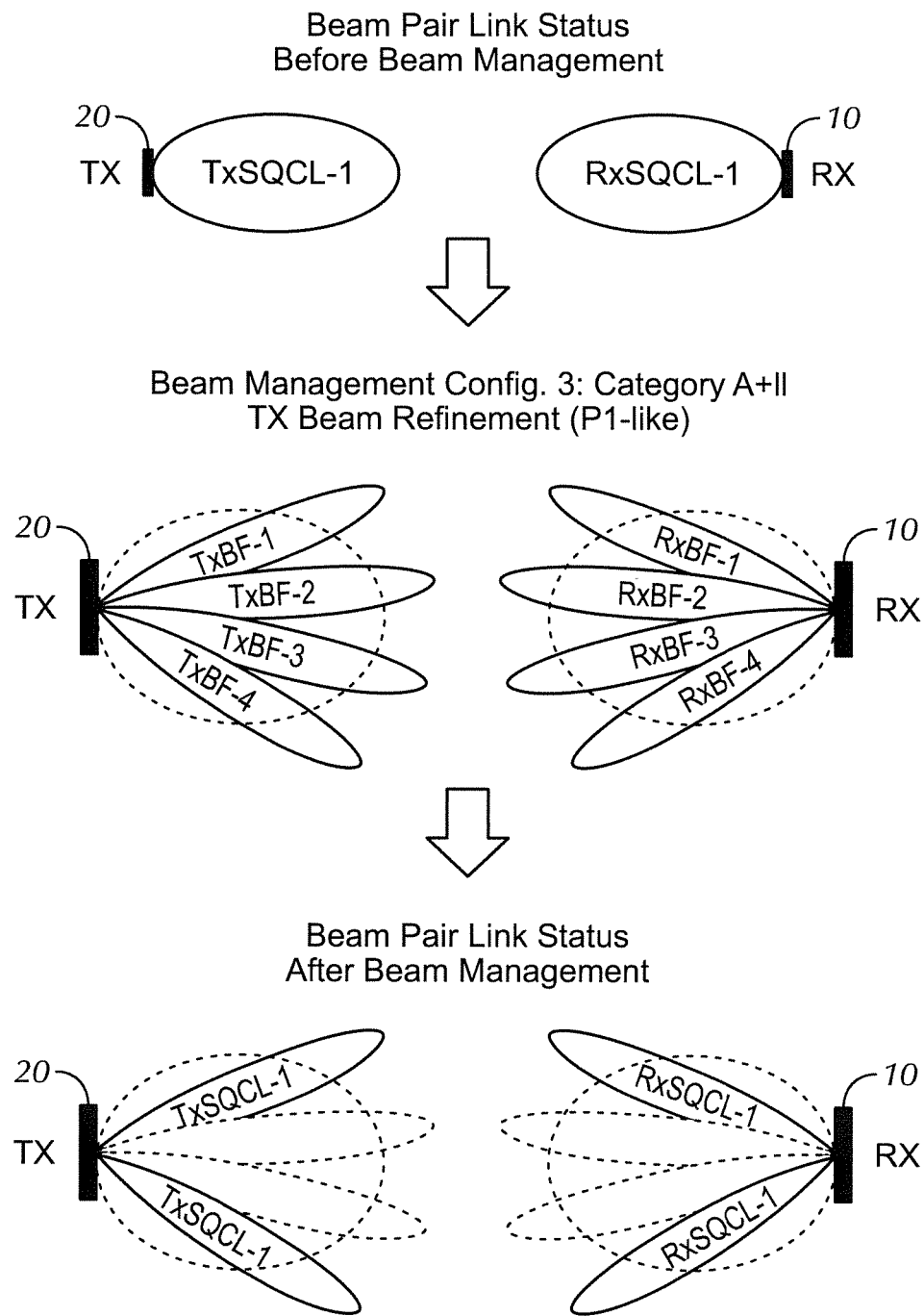
FIGS. 6A and 6B are diagrams showing an example of a beam management scheme and a CSI-RS Configuration according to one or more embodiments of the present invention.
Figure 6B:
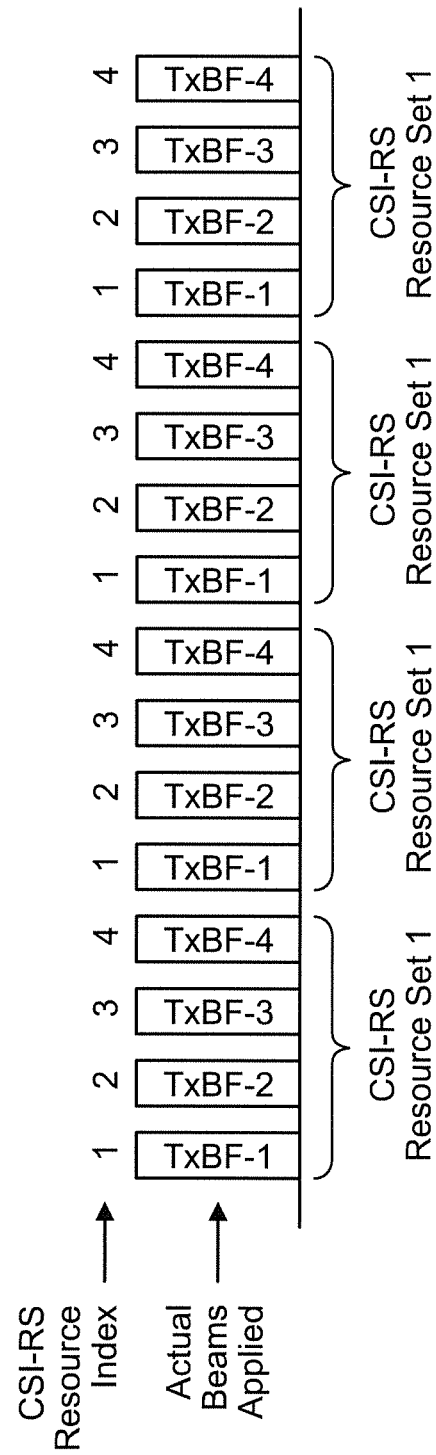

FIGS. 6A and 6B are diagrams showing an example of a BM scheme and a CSI-RS Configuration according to one or more embodiments of the present invention.

As shown in FIG. 6A, before performing BM, the BS 20 may transmit a signal using TX spatially QCL (SQCL)-1 and the UE 10 may receive a signal using RX SQCL-1. The TX SQCL-1 and the RX SQCL-1 are not beamformed.

In the BM according to one or more embodiments of the present invention, a single CSI-RS resource set may be configured in a resource setting. For example, the BS 20 may use different TX beams for different CSI-RS resources within a CSI-RS resource set. The BS 20 may perform TX beam sweeping within a CSI-RS resource set. In one or more embodiments of the present invention, the beams used for the transmission of the CSI-RSs may be referred to CSI-RS resources.

According to one or more embodiments of the present invention, the UE 10 applies the same RX beam for different CSI-RS resources within a CSI-RS resource set. The same CSI-RS resource set is repeated multiple times, and the UE 10 applies different RX beams per each repetition. Then, RX beam sweeping may be performed. For example, as shown in FIG. 6B, when the BS 20 performs TX beam sweeping, the BS 20 may transmit multiple CSI-RSs using different Tx beams (e.g., TX beamformed (BF) beams—1 to 4) within a CSI-RS resource set 1. Each beam within the CSI-RS resource set is associated with a CSI-RS resource index. The CSI-RS resource index identifies a resource used for transmission of each of the multiple CSI-RSs. The BS 20 may transmit multiple CSI-RSs using TX BF-1 to 4 within a CSI-RS resource set 1 repeatedly. Thus, the CSI-RS resource set is repeated in a time domain or a frequency domain.

In the BM, the UE 10 may select at least a CSI-RS resource index and report the selected CSI-RS resource index as CSI feedback. The CSI feedback includes the same information as P2 (or P3 if necessary). As shown in FIG. 6A, the BS 20 and the UE 10 may use beamformed TX SQCL-1 and RX SQCL-1, respectively, based on a result of the BM.

Figure 7:
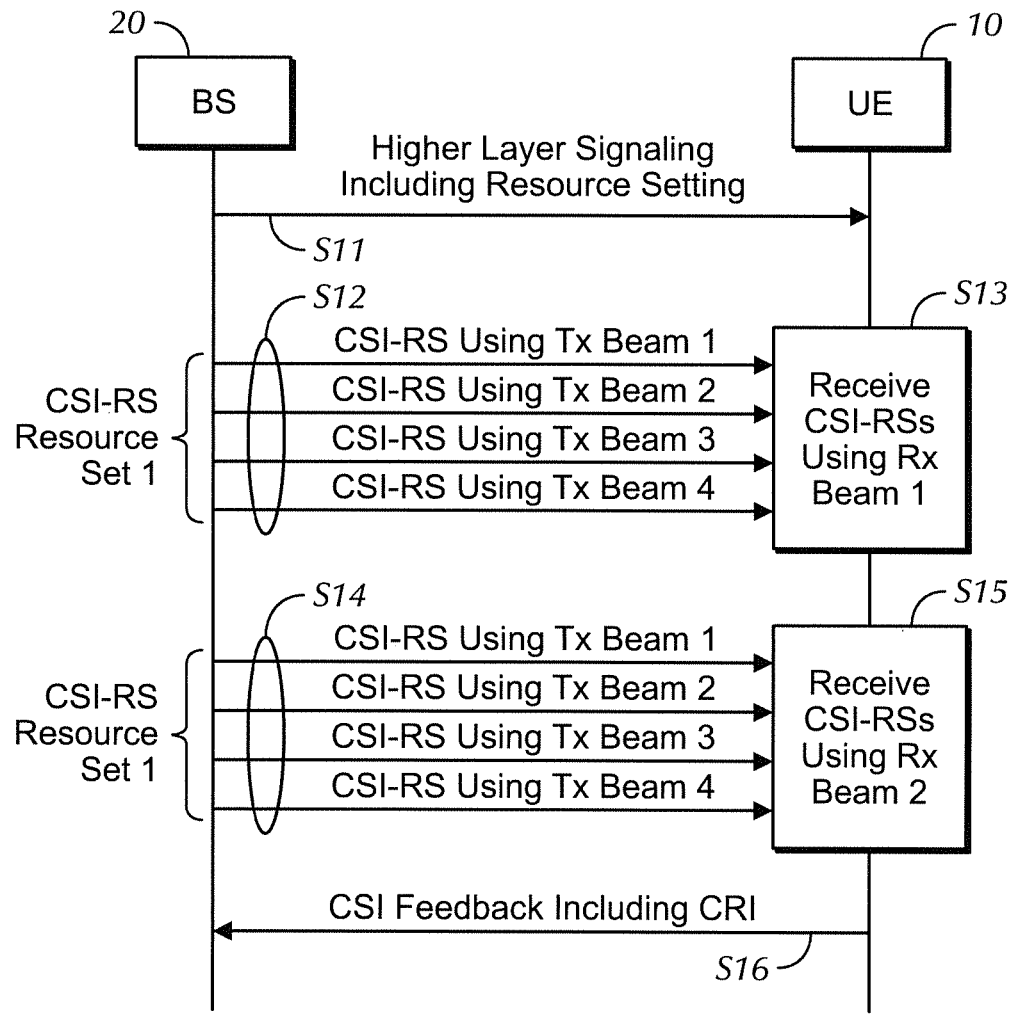
FIG. 7 is a sequence diagram showing a BM operation according to one or more embodiments of the present invention.

FIG. 7 is a sequence diagram showing a BM operation according to one or more embodiments of the present invention.

As shown in FIG. 7, at step S11, the BS 20 may transmit resource setting information indicating a CSI-RS resource set using higher layer signaling such as a Radio Resource Control signaling. The resource setting information indicates that the CSI-RS resource set is repeated in a time domain or in a frequency domain. The UE 10 may be configured with the notified resource setting information and receive CSI-RSs based on the resource setting information.

At step S12, the BS 20 may transmit CSI-RSs using different TX beams 1-4. The CSI-RS resource set 1 consists of the TX beams 1-4 (CSI-RS resources). The CSI-RSs are transmitted using the TX beams 1-4 (CSI-RS resources), respectively. In one or more embodiments of the present invention, the number of TX beams is not limited to four and may be at least two.

At step S13, the UE 10 may receive the CSI-RSs using a RX beam 1.

At step S14, the BS 20 may transmit CSI-RSs using TX beams 1-4 repeatedly. The CSI-RS resource set 1 consists of the TX beams 1-4 (CSI-RS resources). The CSI-RSs are transmitted using the TX beams 1-4 (CSI-RS resources), respectively. Thus, the CSI-RS resource set 1 is repeated in a time domain or a frequency domain. For example, when the semi-persistent CSI-RS resource/resource set/resource setting transmission or periodic CSI-RS resource/resource set/resource setting transmission is applied to transmission of CSI-RSs, the CSI-RS resource set is repeated.

At step S15, the UE 10 may receive the CSI-RSs using a RX beam 2.

After the step S15, the BS 20 may transmit the CSI-RSs using TX beams 1-4 one or more times. The UE 10 may receive the CSI-RSs from the BS 20 using another RX beam.

The UE 10 may select at least a TX beam from the TX beams 1-4. Each Tx beam may be identified by the CRI or beam index (BI). For example, the UE 10 may measure reception quality of the received CSI-RSs and determine at least a TX beam (or CRI) for the CSI reporting based on the measurement results.

At step S16, the UE 10 may perform CSI reporting including the selected CRI(s) to the BS 20.

Thus, according to one or more embodiments of the present invention, the BS 20 may transmit, to the UE, multiple CSI-RSs in a CSI-RS resource set that consists of CSI-RS resources (e.g., TX beams). The multiple CSI-RSs may be transmitted using the CSI-RS resources, respectively. The CSI-RS resource set may be repeated in a time domain or a frequency domain. The BS 20 may transmit, to the UE, second multiple CSI-RSs in the repeated CSI-RS resource set.

According to one or more embodiments of the present invention, when semi-persistent CSI-RS resource/resource set/resource setting transmission or periodic CSI-RS resource/resource set/resource setting transmission is applied to transmission of CSI-RSs, the CSI-RS resource set may be repeated.

According to one or more embodiments of the present invention, the CSI-RS resources (e.g., TX beams) in the CSI-RS resource set may be different from each other. In other words, the CSI-RS resources in the CSI-RS resource set have different CSI-RS resource IDs.

As another example of repetition of the CSI-RS resource set, multiple CSI-RS resource setting may be configured and each CSI-RS resource setting consists of the same CSI-RS resource ID. By configuring either periodic semi-persistent CSI-RS resource/resource set/resource setting transmission or periodic CSI-RS resource/resource set/resource setting transmission for the multiple CSI-RS resource settings, the periodic or semi-persistence repeat of CSI-RS resource set is realized. Even by configuring aperiodic CSI-RS resource/resource set/resource setting transmission for the multiple CSI-RS resource settings, a one-time repeat of the CSI-RS resource set within multiple CSI-RS resource settings can be realized. Thus, the CSI-RS resource set that consists of the CSI-RS resources having the same CSI-RS resource ID may be configured as periodic, semi-persistent, or aperiodic.

Figure 8A:
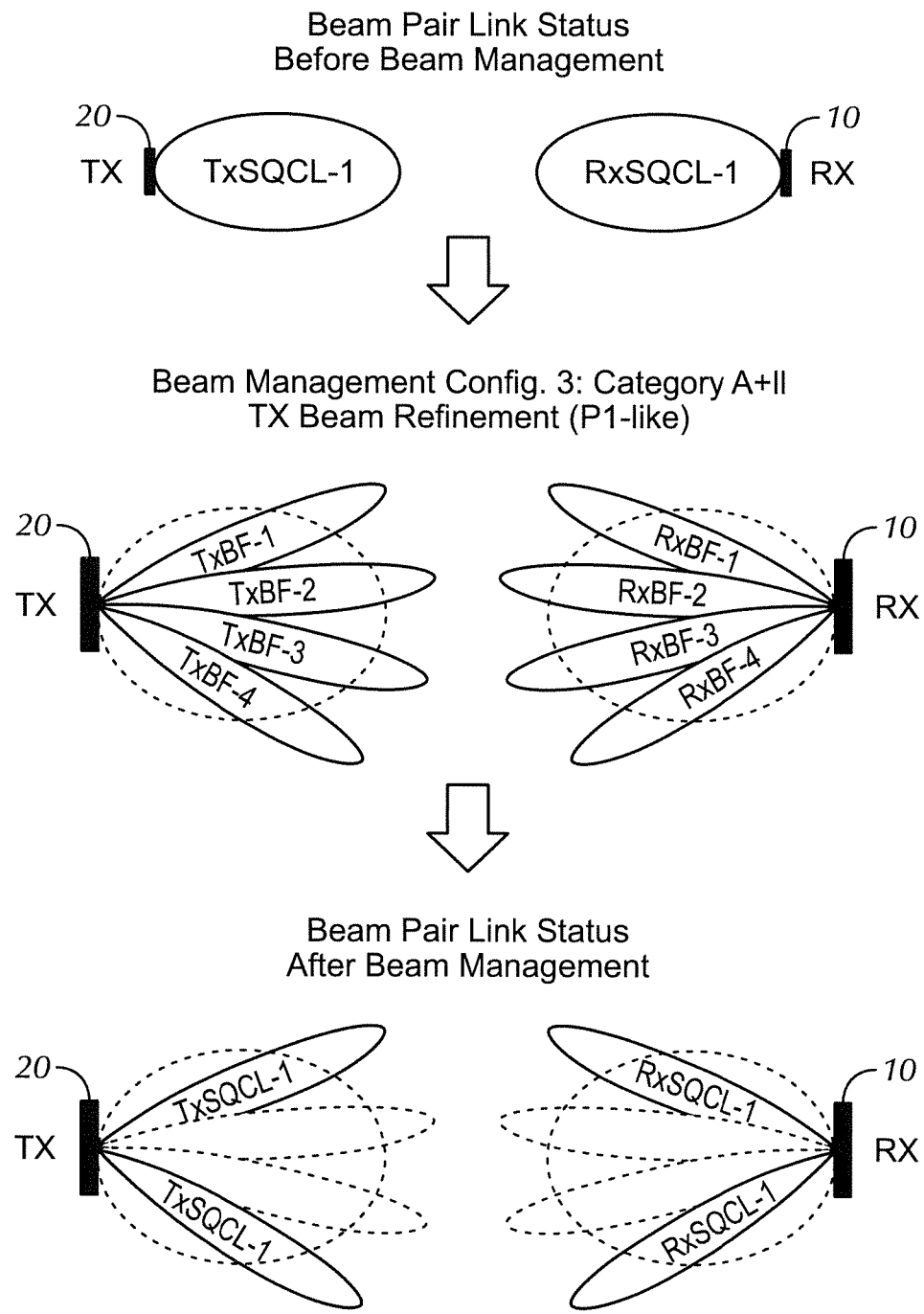
FIGS. 8A and 8B are diagrams showing an example of a beam management scheme and a CSI-RS Configuration according to one or more embodiments of another example of the present invention.
Figure 8B:
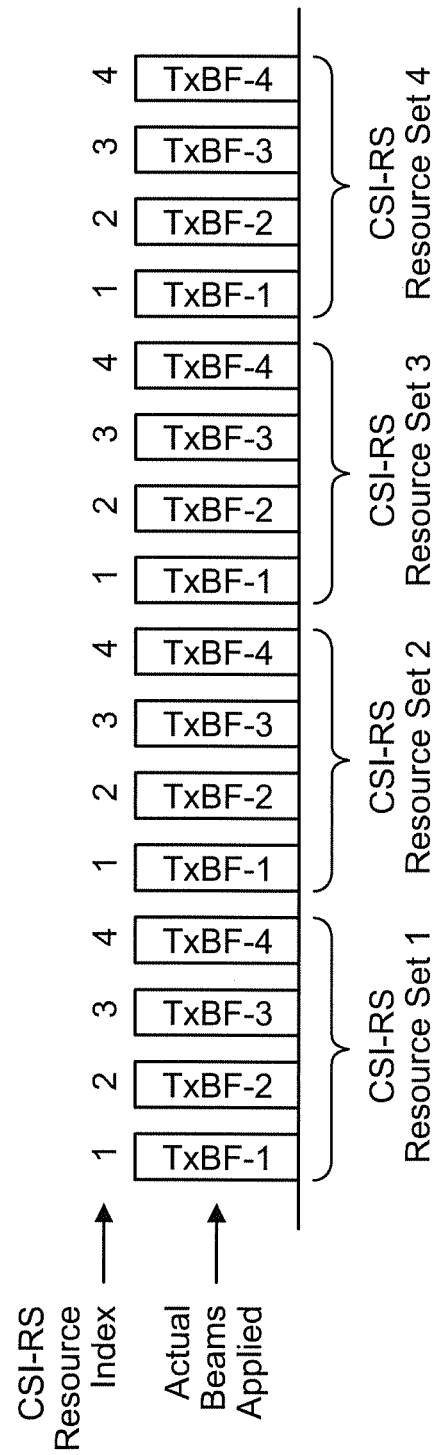

According to one or more embodiments of another example of the present invention, as shown in FIGS. 8A and 8B, multiple CSI-RS resource sets are configured in a resource setting. Different TX beams are used for different CSI-RS resources within a resource set. TX beam sweeping may be performed within a resource set. The UE 10 applies the same RX beam for different CSI-RS resources within a resource set. The different RX beams are used for different CSI-RS resource sets. The RX beam sweeping may be performed across different resource sets. According to one or more embodiments of another example of the present invention, the UE 10 reports CSI-RS resource set indicator(s) and/or CRI for CRI feedback. If the same CRI can be selected from a single resource set, CRI only reporting may be sufficient. If the same CRI is selected from multiple resource sets, the resource set index may be needed.

The method according to one or more embodiments of the present invention may relax UE implementation complexity (allow longer RX beam switching time) and support different UE categories (beam sweeping is not constrained by # of symbols per slot). Furthermore, in one or more embodiments of the present invention, more unified design as the other beam sweeping/selection procedure (CRI only feedback) and simplified signaling design (single resource set with repetition) may be provided.

The conventional method requires the UE to change RX beams per CSI-RS time unit, which increase the UE implementation complexity and is only suitable for high-end UE. One or more embodiments of the present invention only require UE to change RX beams per CSI-RS set time unit, which greatly relaxes the UE complexity.

The conventional method may limit the number of CSI-RS within a CSI-RS set due to the time domain configuration. For example, if a CSI-RS set is a slot which contains 4 possible symbols and each symbol is carrying one CSI-RS, then it allows a UE to have 4 different RX beams. In addition, in a network, different UEs may need to sweep different number of RX beams. The method according to embodiments of the present invention accommodates UE RX beam sweeping by configuring different number of CSI-RS sets. As the time unit per set is much a super set of time unit of CSI-RS. It is easier to flexibly change the set number to accommodate different UEs with different required beam sweeping number.

The conventional method needs to report CSI-RS set index, whereas the method according to embodiments of the present invention only reports CSI-RS index. The method according to embodiments of the present invention is fully compatible with the existing system design with respect to the reporting type.

(Configuration of BS)

The BS 20 according to one or more embodiments of the invention will be described below with reference to FIG. 8. FIG. 8 shows a schematic configuration of the BS 20 according to one or more embodiments of the invention. The BS 20 may include a plurality of antennas (antenna element group) 201, amplifier 202, transceiver (transmitter/receiver) 203, a baseband signal processor 204, a call processor 205, and a transmission path interface 206.

User data that is transmitted on the DL from the BS 20 to the UE 20 is input from the core network 30, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and precoding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., RRC signaling and broadcast channel). Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the BS 20, radio frequency signals are received in each antenna 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network 30 through the transmission path interface 206. The call processor 205 performs call processing such as setting up and releasing a communication channel, manages the state of the BS 20, and manages the radio resources.

(Configuration of User Equipment)

Figure 9:
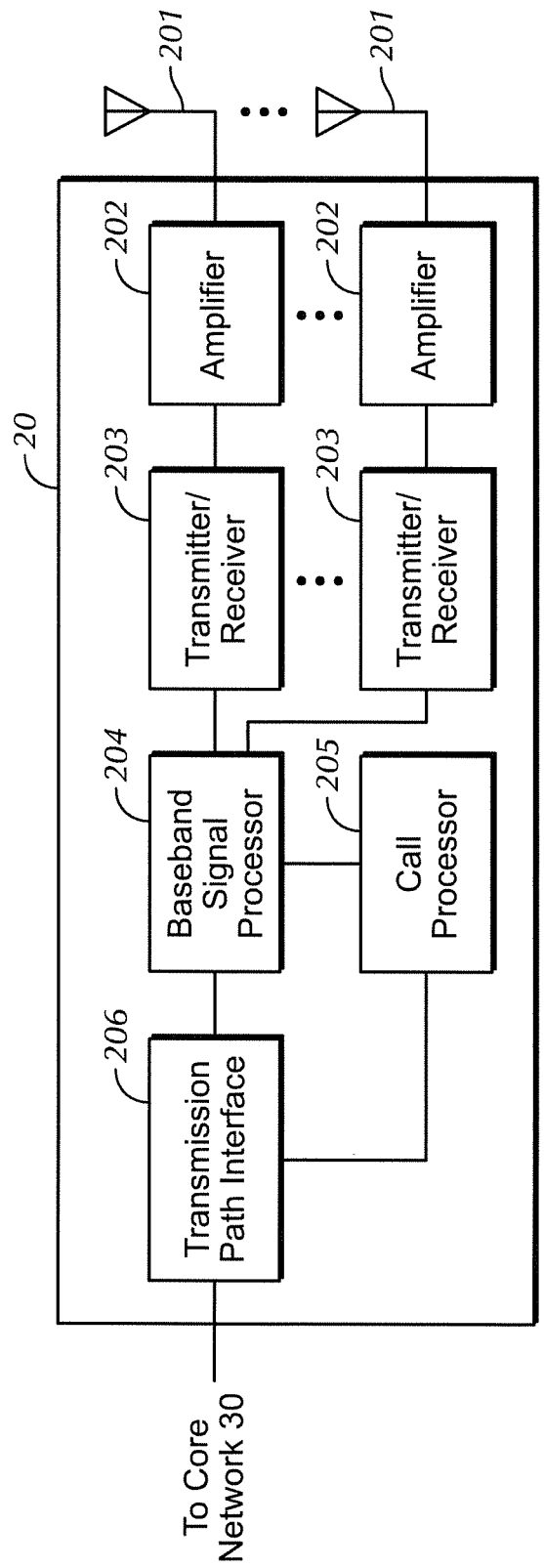
FIG. 9 is a diagram showing a schematic configuration of the gNB according to one or more embodiments of the present invention.
Figure 10:
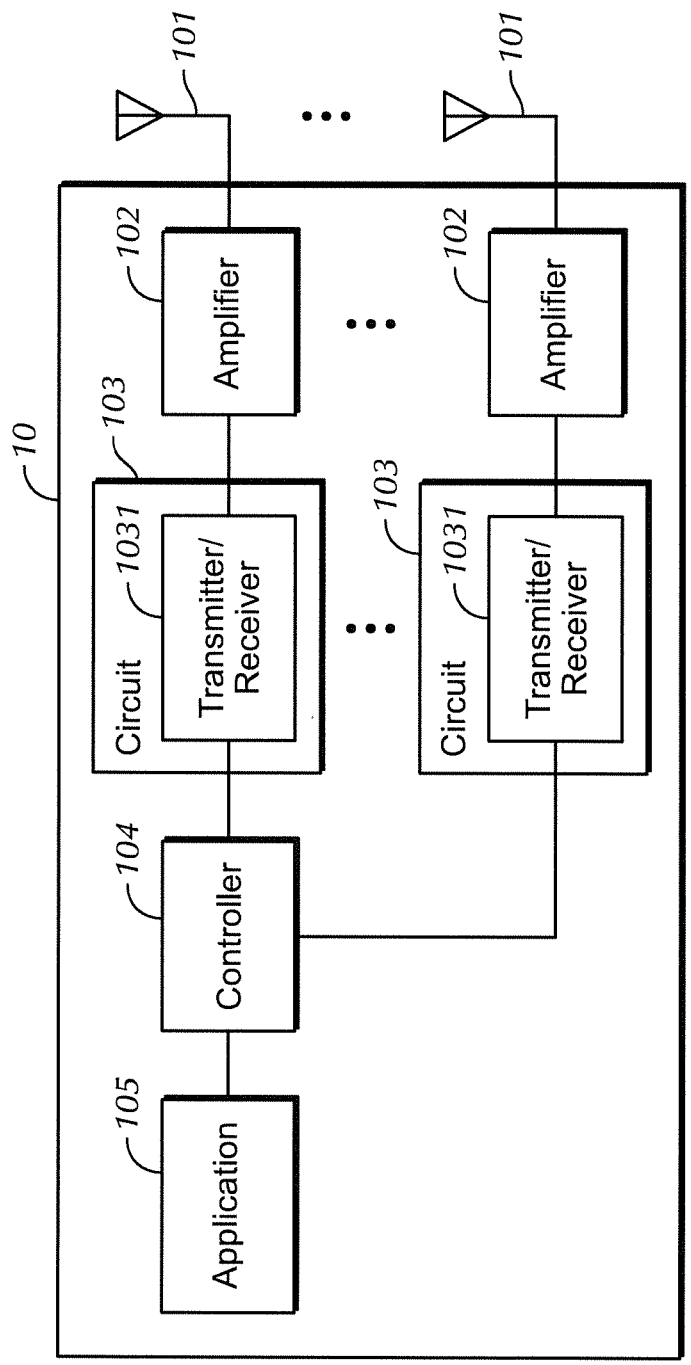
FIG. 10 is a diagram showing a schematic configuration of the UE according to one or more embodiments of the present invention.

The UE 10 according to one or more embodiments of the invention will be described below with reference to FIG. 9. FIG. 9 shows a schematic configuration of the UE 10 according to one or more embodiments of the invention. The UE 10 has a plurality of UE antennas 101, amplifiers 102, the circuit 103 comprising transceiver (transmitter/receiver) 1031, the controller 104, and an application 105.

As for DL, radio frequency signals received in the UE antennas 101 are amplified in the respective amplifiers 102, and subjected to frequency conversion into baseband signals in the transceiver 1031. These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

One or more embodiments of the present invention may be used for the FL DM-RS and the additional DM-RS.

One of more embodiments of the present invention may be used for DM-RS for CP-OFDM uplink and downlink. If it is applied for the downlink, the technologies for the signaling can be also used to UE assumption for DM-RS measurement.

One or more embodiments of the present invention may be used for each of the uplink and the downlink independently. One or more embodiments of the present invention may be also used for both of the uplink and the downlink in common. The uplink channel and signal may be replaced with the downlink signal channel and signal.

Although the present disclosure mainly described examples of a channel and signaling scheme based on NR, the present invention is not limited thereto. One or more embodiments of the present invention may apply to another channel and signaling scheme having the same functions as NR such as LTE/LTE-A and a newly defined channel and signaling scheme.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A user equipment (UE) comprising:
    a receiver that receives, by higher layer signaling, information for configuring multiple Channel State Information-Reference Signal (CSI-RS) resource sets; and
    a processor that, for each of the multiple CSI-RS resource sets, measures multiple CSI-RS resources and reports, based on the measurement results, an index of at least one CSI-RS resource selected from the multiple CSI-RS resources,
    wherein:
        a plurality of groups, each including multiple CSI-RS resource sets are transmitted repeatedly, each of the multiple CSI-RS resource sets is associated with a different beam,
the multiple CSI-RS resources for each of the multiple CSI-RS resource sets are transmitted in different symbols,
the receiver repeatedly receives the plurality of groups including the multiple CSI-RS resource sets, and
the plurality of groups configured for the configuration of the CSI-RS resource sets are repeated for the configuration of the CSI-RS resource sets.

2. The UE according to claim 1, wherein the index of at least one CSI-RS resource includes one index associated with a best result among measurement results based on the multiple CSI-RS resources.

3. A radio communication method for a user equipment (UE) comprising:
   receiving, by higher layer signaling, information for configuring multiple Channel State Information-Reference Signal (CSI-RS) resource sets; and
   for each of the multiple CSI-RS resource sets, measuring multiple CSI-RS resources and reporting, based on the measurement results, an index of at least one CSI-RS resource selected from the multiple CSI-RS resources,
   wherein:
      a plurality of groups, each including multiple CSI-RS resource sets are transmitted repeatedly,
      each of the multiple CSI-RS resource sets is associated with a different beam,
      the multiple CSI-RS resources for each of the multiple CSI-RS resource sets are transmitted in different symbols,
      the plurality of groups including the multiple CSI-RS resource sets are received repeatedly, and
      the plurality of groups configured for the configuration of the CSI-RS resource sets are repeated for the configuration of the CSI-RS resource sets.

4. A base station comprising:
   a transmitter that transmits, by higher layer signaling, information for configuring multiple Channel State Information-Reference Signal (CSI-RS) resource sets including multiple CSI-RS resources measured for each of the multiple CSI-RS resource sets; and
   a receiver that receives an index of at least one CSI-RS resource selected from the multiple CSI-RS resources, the index being reported based on the measurement results for each of the multiple CSI-RS resource sets,
   wherein:
      a plurality of groups, each including multiple CSI-RS resource sets are transmitted repeatedly,
      each of the multiple CSI-RS resource sets is associated with a different beam,
      the multiple CSI-RS resources for each of the multiple CSI-RS resource sets are transmitted in different symbols, and
      the plurality of groups configured for the configuration of the CSI-RS resource sets are repeated for the configuration of the CSI-RS resource sets.

5. A system comprising a user equipment (UE) and a base station, wherein the UE comprises:
   a first receiver that receives, by higher layer signaling, information for configuring a multiple Channel State Information-Reference Signal (CSI-RS) resource sets; and
   a processor that, for each of the multiple CSI-RS resource sets, measures multiple CSI-RS resources and reports, based on the measurement results, an index of at least one CSI-RS resource selected from the multiple CSI-RS resources,
   wherein:
      a plurality of groups, each including multiple CSI-RS resource sets are transmitted repeatedly,
      each of the multiple CSI-RS resource sets is associated with a different beam,
      the multiple CSI-RS resources for each of the multiple CSI-RS resource sets are transmitted in different symbols,
      the first receiver repeatedly receives the plurality of groups including the multiple CSI-RS resource sets, and
      the plurality of groups configured for the configuration of the CSI-RS resource sets are repeated for the configuration of the CSI-RS resource sets, and
   the base station comprises:
      a transmitter that transmits the information; and
      a second receiver that receives the index of at least one CSI-RS resource.

* * * * *